Patented July 7, 1925.

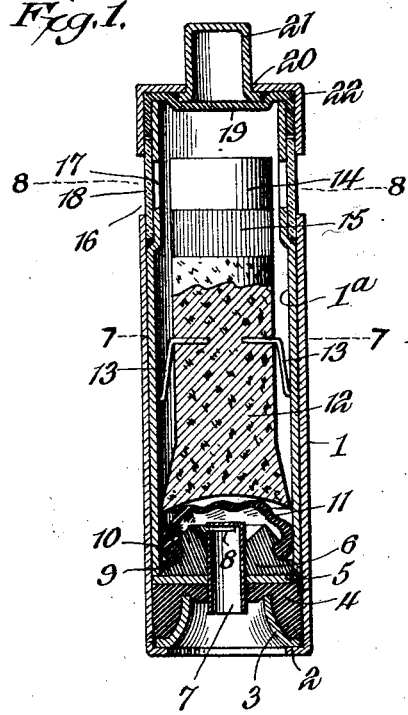

1,544,701

UNITED STATES PATENT OFFICE.

MOSE THOMPSON, OF INDIANAPOLIS, INDIANA.

LEAK INDICATOR.

Application filed June 6, 1923. Serial No. 643,768.

To all whom it may concern:

Be it known that I, MOSE THOMPSON, a citizen of the United States, residing at Indianapolis, in the county of Marion and State of Indiana, have invented new and useful Improvements in Leak Indicators, of which the following is a specification.

My present invention pertains to indicators, and it contemplates the provision of a device through the medium of which it may be readily and easily ascertained of the valve of a pneumatic tire after said tire has been properly inflated is leaking.

The invention further contemplates the provision of a device of the character indicated that is inexpensively constructed and so arranged that liability of forcing the stem of the valve downwardly and thus releasing air from the tire is precluded and hence the device will only indicate the character of an actual leak in or around the valve.

Other advantageous characteristics of the invention will be fully understood from the following description and claims when the same are read in connection with the drawings accompanying and forming part of this specification, in which:

Figure 1 is a longitudinal sectional view of my device as it appears after recording a valve leak.

Figure 2 is a similar view of a portion of the indicator and showing the manner in which the working elements are returned to their normal positions.

Figure 3 is a detail view of the interior casing of the device showing how same appears when the valve of a pneumatic tire is working properly.

Figures 4 and 5 show the appearance of said interior when the valve has a slow or fast leak.

Figure 6 is a detail view of the portion of my device that surrounds the valve stem.

Figures 7 and 8 are cross-sectional views of the device taken in the plane indicated by lines 7—7 and 8—8 respectively of Figure 1.

Figure 8 is a view illustrating the band that is employed to indicate visually that a leak is present in the valve.

Similar numerals of reference designate corresponding parts in all the views of the drawings.

My novel device comprises a push-button 21 that is hollow interiorly and adapted to seat in the hollow of the push-button is a cork or other suitable material (not shown) and the said button is mounted in the upper end 22 of exterior casing 1 of my device, said button being limited in its upward movement due to the turned end 20 thereof. Arranged in the upper end of the outer casing 1 and directly below the button 21 is a soft rubber cap 19. This cap is securely retained between the inner and outer casings of the device and movement due to leakage of a valve will move the button 21 upwardly.

Sight openings 16 are provided in the casing 1 and surrounding said openings I arrange a transparent celluloid band 18 and arranged within the casing 1 and moveable independently thereof is a plunger 12 of cork or other suitable light material and said plunger is surrounded on its upper end by a band of paper or other suitable material that is white as indicated by 14 and preferably red as indicated by 15. Manifestly upward movement of the plunger 12 will cause the red portion 15 to appear at the sight openings.

In order to hold the plunger up until forced downwardly by the movement of button 21, I provide the small and extremely flexible wires 13 that enter the plunger at one end and bear at their opposite ends against the inner surface of an interior casing 1ª.

Arranged near the lower end of the interior casing 1ª and below the plunger 12 is an expansionable bag 11 of extremely thin para gum. This bag 11 is provided with the base 10 and adapted to surround the base and retain same within the casing is an expansion bag base of stiff rubber 6 while below this base is a support 5 formed after the manner of a metal washer.

Arranged within the extreme lower end of the device is a cylinder 7 having the opening 8 and surrounding the lower end of the cylinder 7 is valve port packing 4. The cylinder 7 communicates with the valve guide 2 having the flared mouth 3 whereby liability of striking the valve pin or stem when adjusting the indicator thereon is precluded.

In the practical operation of the device the same is positioned over the valve of a pneumatic tire and if there is a leak either in the valve or immediately surrounding same, the air from the leak will travel up the cylinder 7 out of the slot or opening 8 and either slowly or quickly inflate the bag 11 according to the nature of the leak. Inflation of the bag 11 will move the plunger 12 upwardly and this will cause the red portion of the band to appear at the sight opening.

If a slow leak is present the red portion will move very slowly upward and if a quick leak the passage of the red portion will be rapid.

Movement of the plunger 12 will also move the rubber cap 19 and button upwardly. To return the elements of the device to their normal position it is simply necessary to press downwardly on the button.

The device is extremely simple and inexpensive and yet is positive in action and because of such construction the nature of leaks about a valve stem may be readily detected.

I provide the tube 7 with a closed upper end and the side slot 8 because I find that quite frequently, especially where a fast leak is present, a large amount of grit enters the tube 7 and this arrangement baffles grit as far as possible from entering the bag 11 which would thereby eventually impede working of the device.

With an open upper end the grit would clog the bag 11 and foreign matter would quickly reach the bag.

Having described my invention, what I claim and desire to secure by Letters Patent is:—

1. In a leak detector, the combination of a casing having one end open and provided with sight openings adjacent the other end thereof, a valve guide having a flared mouth and arranged in the open end of the casing, a tube arranged in the guide, and having a slot near its upper end, an expansionable bag secured in the casing and inclosing the upper end of the tube, packing interposed between the secured end of the bag and tube, a plunger of cork arranged to bear against the bag, means for holding the plunger at the point it is raised by the bag, a band secured to the upper end of the plunger, a cap movable in one direction by the plunger and arranged above the plunger within the casing, and a button arranged on the extreme upper end of the casing for moving the cap downwardly against the plunger.

2. In a leak detector, the combination of a casing provided with sight openings, a valve guide arranged in said casing, a tube arranged in the guide and having a slot in its side near its upper end, an expansionable bag arranged in the casing above the tube, packing interposed between the tube and casing, a plunger actuable in one direction by the bag, springs for holding the plunger at the point it is raised by the bag, a band secured to the plunger, a cap movable by the plunger, and a button arranged on the casing for moving the cap downwardly within the casing.

In testimony whereof I have hereunto set my hand in presence of two subscribing witnesses.

MOSE THOMPSON.

Witnesses:
 LOUIS B. CALVELAGE,
 FRANK DRIVER.